US006108870A

United States Patent [19]

Lo

[11] Patent Number: 6,108,870

[45] Date of Patent: *Aug. 29, 2000

[54] TOOL HANDLE COMBINATION

[76] Inventor: Chi Yu Lo, P.O. Box 63-99, Taichung, Taiwan, 406

[ * ] Notice: This patent is subject to a terminal disclaimer.

[21] Appl. No.: 09/192,662

[22] Filed: Nov. 14, 1998

[51] Int. Cl.[7] ................................ A47J 45/00; E05B 1/00

[52] U.S. Cl. ................................ 16/431; 16/436; 16/902; 16/DIG. 12; 81/489; 81/177.1

[58] Field of Search .............................. 16/431, 436, 430, 16/902, 441, 442, DIG. 12, DIG. 18, DIG. 19; 81/489, 436, 177.1, DIG. 5; 74/551.9, 543, 553; 40/661.12, 314, 331, 663

[56] References Cited

U.S. PATENT DOCUMENTS

| | | | |
|---|---|---|---|
| 1,974,682 | 9/1934 | Margoshes | 40/331 |
| 3,185,001 | 5/1965 | Viator | 81/489 |
| 4,739,536 | 4/1988 | Bandera et al. | 16/430 |
| 4,837,892 | 6/1989 | Lo | 16/430 |
| 5,261,665 | 11/1993 | Downey | 16/DIG. 12 |
| 5,290,063 | 3/1994 | Lenhart | 16/DIG. 12 |
| 5,398,369 | 3/1995 | Heinzelman et al. | 16/DIG. 12 |
| 5,511,331 | 4/1996 | Morosini | 40/316 |
| 5,722,116 | 3/1998 | Lin | 16/DIG. 12 |
| 5,740,586 | 4/1998 | Gomas | 16/DIG. 12 |

FOREIGN PATENT DOCUMENTS

| | | |
|---|---|---|
| 0429408 | 5/1991 | European Pat. Off. . |

*Primary Examiner*—Chuck Y. Mah

[57] ABSTRACT

A tool handle includes a handle member, a number of blocks attached to the handle member, and a cover sleeve engaged on the handle member and having a number of orifices for receiving the blocks and for retaining the blocks in place. The handle member includes a number of cavities, and the blocks each includes one or more projections engaged into the cavities of the handle member for attaching onto the handle member and for allowing the user to adjust the blocks into various kinds of shapes and patterns.

1 Claim, 3 Drawing Sheets

TOOL HANDLE COMBINATION

BACKGROUND OF THE INVENTION

1. Field of the Invention

The present invention relates to a tool, and more particularly to a tool handle combination.

2. Description of the Prior Art

Typical tool handles comprise a solid structure that may not be formed with various patterns.

The present invention has arisen to mitigate and/or obviate the afore-described disadvantages of the conventional tool handles.

SUMMARY OF THE INVENTION

The primary objective of the present invention is to provide a tool handle combination which may be formed with various kinds of shapes or patterns.

In accordance with one aspect of the invention, there is provided a tool handle comprising a handle body, a plurality of blocks attached to the handle body, and a cover sleeve engaged on the handle body and having a number of orifices for receiving the blocks.

The handle body includes a plurality of cavities formed therein, the blocks each includes at least one projection engaged into the cavities of the handle body for attaching onto the handle body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
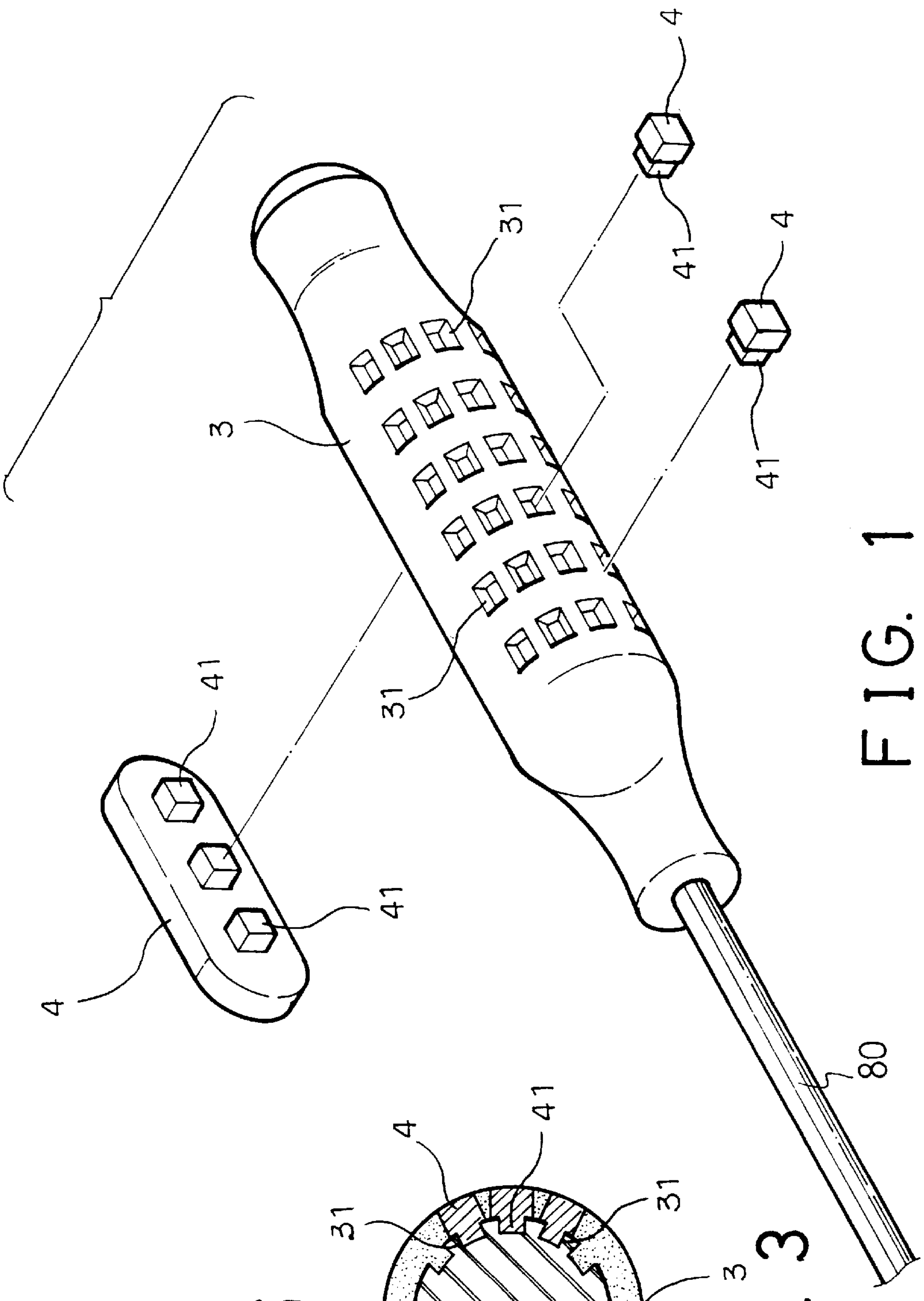
FIG. 1 is a partial exploded view of a tool in accordance with the present invention.
Figure 3:
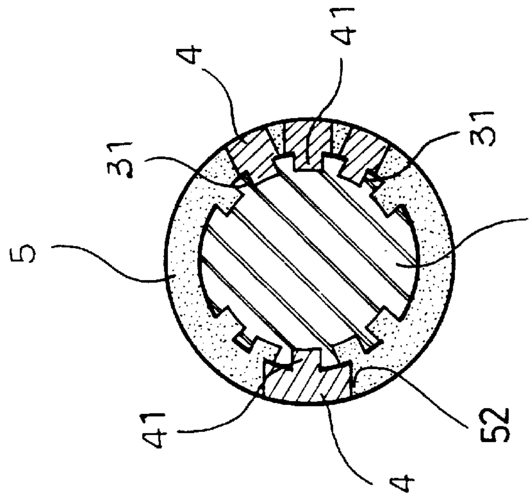
FIG. 3 is a cross sectional view taken along lines 3—3 of FIG. 2.
Figure 2:
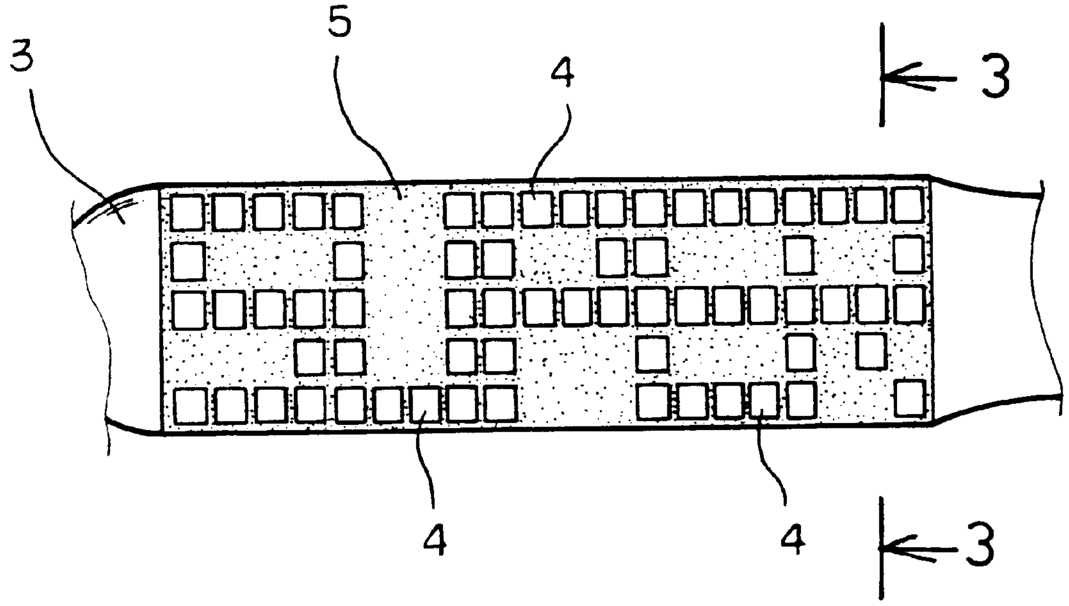
FIG. 2 is a partial plan view of the tool.

Referring to the drawings, and initially to FIGS. 1–3, a tool in accordance with the present invention comprises a tool member 80 secured to a handle 3 so as to be driven by the handle 3. The handle 3 includes a number of cavities 31 formed therein. A number of blocks 4 each includes one or more projections 41 engaged into the cavities 31 of the handle 3 and secured to the handle 3 by such as force-fitted engagement or by adhesive materials. A cover sleeve 5 is then applied onto the outer portion of the handle 3 and includes a number of orifices 52 formed therein for receiving the blocks 4 and for allowing the blocks 4 to be seen through the orifices 52. The blocks 4 may be secured in place by the cover sleeve 5. But, if required, the cover sleeve 5 may also be formed with the orifices 52 therein and then engaged onto the handle 3. The cover sleeve 5 may further apply a retaining force to detachably retain the blocks 4 in place.

It is to be noted that the blocks 4 may be arranged to various shapes or patterns according to the user's need. The user may also rearrange the blocks 4 to the other patterns if required. The handle 3 and the blocks 4 may be secured together and disposed in a mold device and then the cover sleeve 5 may be formed and applied onto the handle 3 by a molding process.

Figure 4:
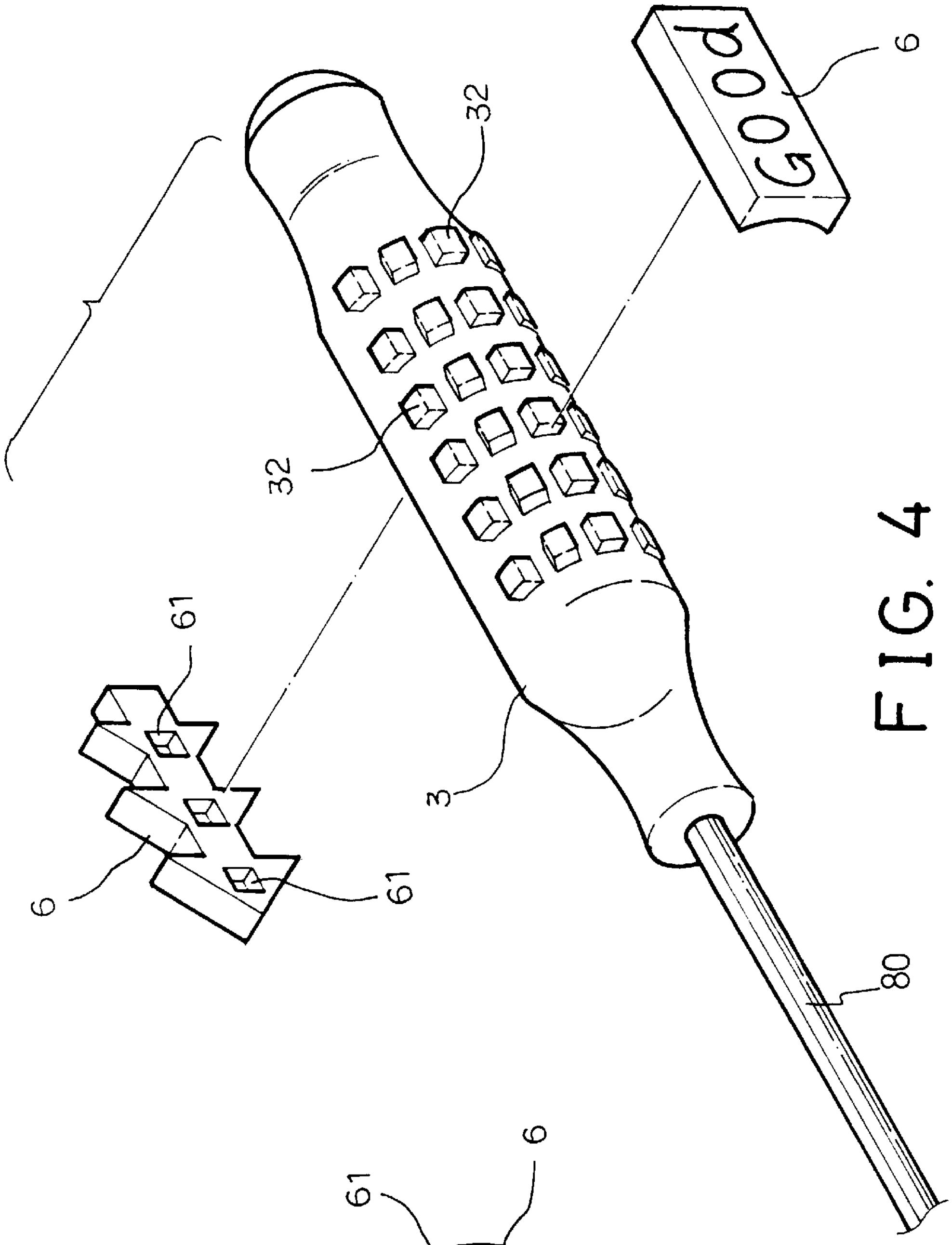
FIG. 4 is an exploded view similar to FIG. 1 showing another application of the tool handle.
Figure 5:
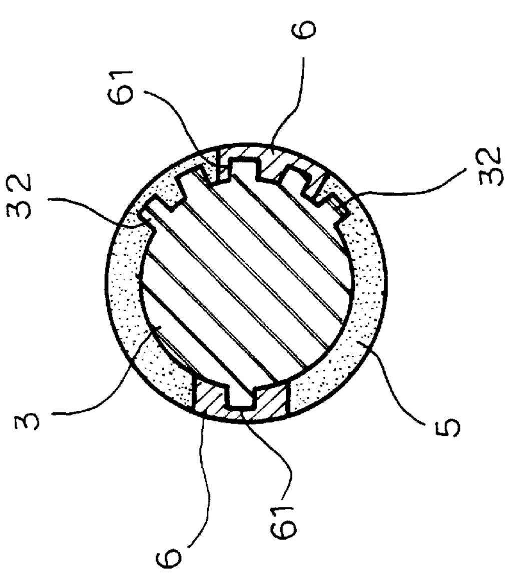
FIG. 5 is a cross sectional view of the tool handle as shown in FIG. 4.

Referring next to FIGS. 4 and 5, alternatively, the handle 3 may include a number of projections 32 extended therefrom for engaging into the cavities 61 that are formed in the blocks 6.

Accordingly, the tool handle combination in accordance with the present invention may be formed with or arranged into various kinds of shapes or patterns.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool handle comprising:

a handle body including a plurality of cavities formed therein, a plurality of blocks attached to said handle body, said blocks each including at least one projection engaged into said cavities of said handle body respectively for attaching onto said handle body, and a cover sleeve engaged on said handle body and including a plurality of orifices formed therein for receiving said blocks.

* * * * *